United States Patent

Wildhaber

[15] 3,689,744

[45] Sept. 5, 1972

[54] METHOD AND APPARATUS FOR SCANNING CHARACTERS

[72] Inventor: Ernest Wildhaber, 124 Summit Drive, Rochester, N.Y. 14620

[22] Filed: Sept. 22, 1970

[21] Appl. No.: 74,392

[52] U.S. Cl. ........................235/61.11 E, 250/219 D
[51] Int. Cl............................G06k 7/10, E04g 17/00
[58] Field of Search................235/61.11 E; 250/219; 340/146.3 F

[56] References Cited

UNITED STATES PATENTS 3,322,935 5/1967 Wyke et al. ..........235/61.11 E
3,238,501 3/1966 Mak et al. ............235/61.11 E
3,310,658 3/1967 Ryer......................235/61.11 E
3,453,419 7/1969 Torrey ..................235/61.11 E
3,529,133 9/1970 Kent et al.............235/61.11 E

*Primary Examiner*—D. W. Cook
*Attorney*—Shlesinger, Fitzsimmons & Shlesinger

[57] ABSTRACT

The characters used on the records are symbols made up of parallel straight marks for which equal space partitions are provided. To avoid crowding, the marks are applied on two levels. The space partitions of the two levels are relatively displaced by half the spacing of the partitions. A narrow beam of light is passed over each line of characters from one end to the other. An image of the narrow lighted area is formed adjacent a point common to all character positions. The rays of the two image halves that correspond to the two character levels are transmitted to different photocells. The fluctuating electric currents received therefrom are combined after transformation.

13 Claims, 14 Drawing Figures

INVENTOR :

Ernest Wildhaber

INVENTOR:

Ernest Wildhaber

METHOD AND APPARATUS FOR SCANNING CHARACTERS

The present invention relates to optical scanning of records that contain characters arranged in lines, for transmission for instance to a computer, to storage, or to a distant station. The characters preferably used are symbols made up of parallel marks.

One object of the invention is to provide a simple and reliable method and apparatus that avoids crowding of the marks nor requires symbols of extended width.

A further aim is to use a conventional character space for the symbols without crowding the marks. This space is higher than wide. This aim is attained by applying the marks on two vertically displaced levels.

Another aim is to retain simplicity of transmission by laterally shifting the marks of the two levels by half the spacing of their allotted areas.

Further aims will appear in the course of the specification and in the recital of the appended claims.

Figure 1:
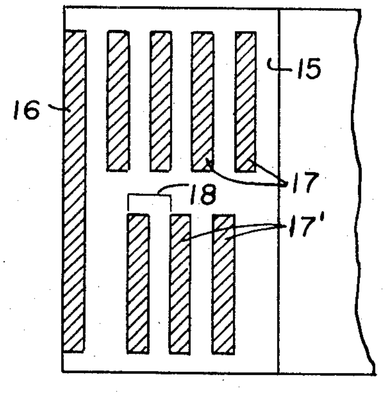
FIG. 1 is an enlarged view of one form of a preferred character space. It contains all marks.
Figure 2:
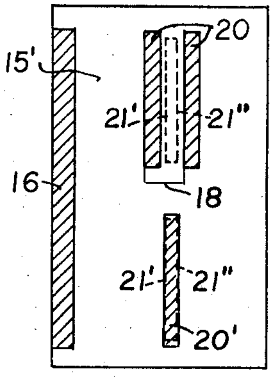
FIGS. 2 and 3 are views of similar character spaces showing three significant marks each.
Figure 3:
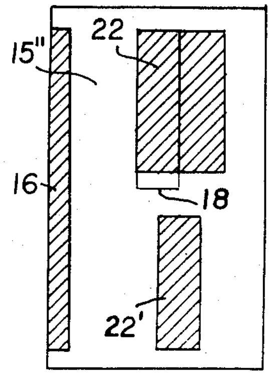

The rectangular character spaces 15, 15′, 15″ shown in FIGS. 1 to 3 contain a mark 16 illustrating one way of signifying the start of a character. FIG. 1 contains significant marks 17, 17′ having constant spacing and constant length, the spacing being indicated at 18 . Here the width of the marks 17, 17′ equals half the spacing.

FIG. 2 shows marks 20, 20′ narrower than half the spacing 18 , as is at present preferred. The area within dotted lines 21′, 21″ is lighted by a narrow beam of light screened down to the length shown. The lighted area or strip shown is narrower than half the spacing 18. And it may be somewhat narrower than the marks 20, 20′.

FIG. 3 shows marks 22, 22′ as wide as spacing 18 .

While I have shown dark marks on light ground, light marks on dark ground could also be used, if desired.

Any number of marks may be used in a character space. The marks may be arranged in any desired code, such as for instance a binary code.

The symbols may be accompanied by lettering, so that anyone can read them. Conventional letters and numbers may be applied on one side of the record and the corresponding symbols on the opposite side, as described in my patent application "Record For Machine Scanning" filed May 12, 1970, Ser. No. 36,610. Crowding is thereby avoided. And the record may be read easily, as no special font is required for the letters.

Figure 4:
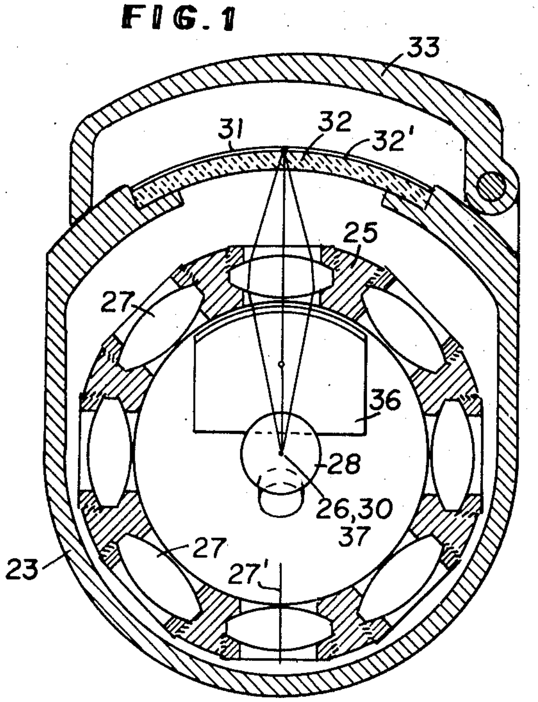
FIG. 4 is a cross-section of an apparatus constructed according to the invention and taken at right angles to the axis of its rotor, along lines 1—1 of FIG. 5.
Figure 5:
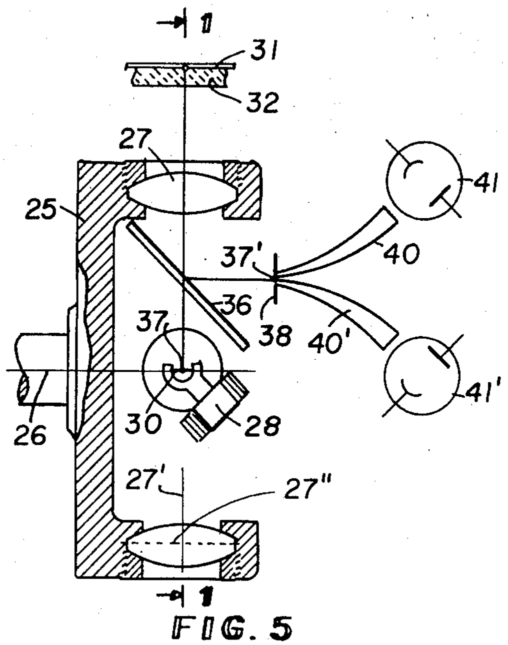
FIG. 5 is an axial section corresponding to FIG. 4.

The apparatus 23 ( FIGS. 4, 5) is generally similar to the apparatus disclosed in my companion application "Optical Scanning Apparatus," filed Mar. 9, 1970, Ser. No. 17,792 . Reference is made thereto. It describes alternative positions of the light source, such as may be used here also.

Apparatus 23 contains a rotor 25 with axis 26 . A plurality of equal lenses 27 are mounted on rotor 25 at a constant distance from its axis 26 . The lens axis 27′ ( FIG. 5) includes an angle with the direction of the rotor axis 26 , a right angle in this case. It intersects the rotor axis at 37 . The plane 27″ of each lens is parallel to axis 26 .

Figure 9:
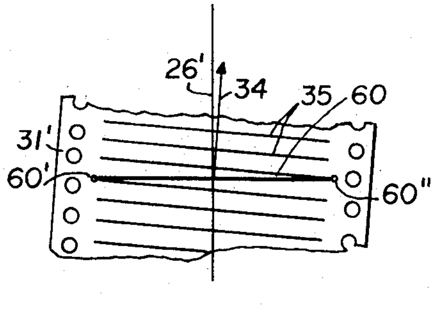
FIG. 9 is a fragmentary view of a record that is moved uniformly.

An incandescent lamp 28 is set with the center of its generally straight filament 30 at point 37 on axis 26. The filament is usually wound helically, and its main filament axis coincides approximately with axis 26 , including an angle of less than 5° therewith. It provides a narrow beam of light for projection to a record 31 that is supported by a refractory curved plate 32 secured to the frame of apparatus 23 . The record hugs a cylindrical outside surface 32′ of plate 32 . It may be fed uniformly at a small angle to the direction of axis 26, as shown in FIG. 9. The axis of the cylindrical supporting surface 32′ passes through center 37 and may extend in the direction of the record feed or coincide with axis 26. In any case it includes an angle of less than 5° with the direction of rotor axis 26. A hinged cover 33 protects the record 31.

The lenses 27 are dimensioned to form an image of the filament 30 on the record, to provide a narrow area or strip of concentrated light. As the rotor turns on its axis, the illuminated strip moves over the scanning line 60 ( FIG. 9) from one end 60′ to the other end 60″.

The record 31′ shown in FIG. 9 is moved uniformly in the direction of arrow 34 at right angles to its character lines 35 , in time with the rotor. It is so inclined to the direction 26′ of the rotor axis that after the lighted strip produced by one lens 27 has reached the end of a character line 35 , the following lens 27 starts on the next character line. Ways of moving the record are known art . Also, if desired, the record may be stationary. A character line then extends along the scanning line.

Part of the light illuminating said narrow strip is reflected back towards the rotor axis. White portions of the record reflect more light, dark marks reflect less light. The marks provide a variation in intensity of the reflected light.

A stationary plane beam splitter 36 is placed in the path of light between the circle of lenses 27 and the rotor axis 26 . Part of the light reflected from the record returns through a lens 27 to form an image of the lighted strip adjacent the center 37 of the filament. This point is common to all positions of the moving lighted strip. Another part of said reflected light forms an image centered at point 37' which is the mirror image of point 37 .

Although light is lost in the beam splitter while forming an image of the filament on the record, and again as light is reflected from the record to form an image adjacent point 37', the illumination is sufficiently concentrated to permit such loss.

The image formed around point 37' of the illuminated narrow strip comprises two halves, one for the upper level of marks, the other for the lower level. A screen 38 confines the light to these two regions. The light of the two levels is conveyed by curved and tapered light pipes 40, 40' to different photocells 41, 41' respectively.

Figure 6:
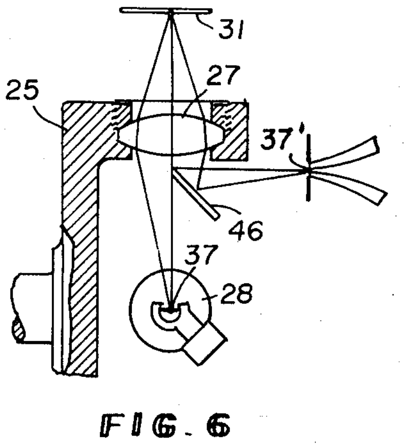
FIGS. 6 and 7 are fragmentary axial sections of modifications.

The modification shown in FIG. 6 substitutes a regular opaque mirror 46 for the beam splitter 36 . Mirror 46 occupies only half the width of lens 27 of the rotor that is identical with the rotor 25 described with FIGS. 4 and 5 . One-half of each lens 27 in turn forms an image of the filament 30 of lamp 28 on record 31 . The other half of said lens 27 forms an image of the narrow lighted strip, adjacent point 37' that is the mirror image of point 37 .

Figure 7:
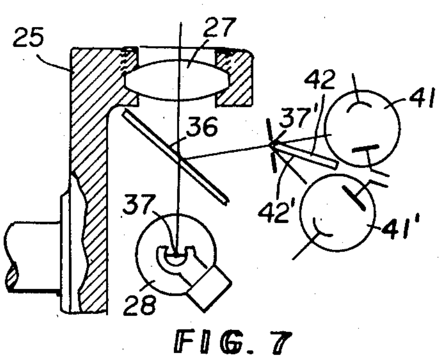

The modification shown in FIG. 7 also uses the same rotor 25, the same lamp 28 and beam splitter 36 , but substitutes a mirror 42 for the light pipes. 42' is the reflecting surface.

While I have shown incandescent lamps 28 in the drawings, these could be replaced by any suitable other source of light, as for instance by lasers, preferably of the non-pulsating or continuous type.

As pointed out with FIGS. 1 to 3 the marks of the two levels of each symbol are shifted with respect to each other in the direction of the line of characters by half the spacing of the individual compartments provided for the marks. This causes the signals of the two levels to be differently timed. They are combined after suitable transformation.

Figure 8:
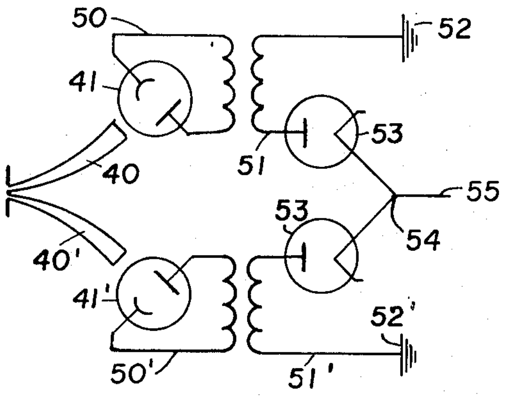
FIG. 8 is a diagram showing circuits for effecting a combination of electric currents received from two photocells.

Diagram FIG. 8 describes one such transformation.

The electric current in the two circuits 50, 50' containing the photocells 41, 41' respectively is transformed in two second circuits 51, 51' respectively. These circuits are grounded at one end, at 52, 52' . Each second circuit contains a half-wave rectifier 53 . Past the rectifiers the circuits 51, 51' are connected, at 54, for joint transmission in wire 55 .

The operation will be described with reference to the diagrams FIGS. 10 to 14.

Figure 10:
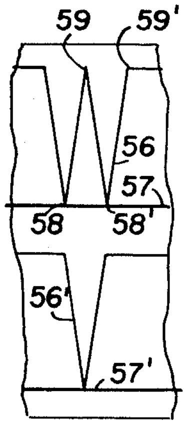
FIG. 10 is a diagram showing the area change of the white reflecting character portions as the light beam passes over marks as shown in FIG. 1, when the lighted area is as wide as the space between the marks.

As the lighted strip or narrow lighted area passes over a mark the intensity of reflected light depends on the width of said strip and on the width of the marks. FIG. 10 shows up the conditions where the width of the lighted area or strip is equal to the width of the marks and equal to half the spacing of the individual compartments reserved for the marks. Diagram FIG. 10 corresponds to three marks of the stated width but arranged on a symbol like the marks of FIG. 2.

As the lighted strip approaches a mark, full light is reflected until the lighted strip gets into contact with the mark. The white lighted area then diminishes. It is measured by the ordinates of graph 56 from base line 57 for the upper level and by the ordinates of graph 56' from base line 57' for the lower level. The reflective white area decreases uniformly until it reaches zero at 58 , when the lighted strip completely coincides with a mark. Thereafter it increases again to its full value at 59 , to decrease again to zero at 58' and to reach the full amount at 59'. The lower level with a single mark corresponds to the single-wave graph 56' .

Figure 11:
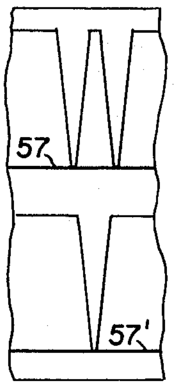
FIG. 11 is a similar diagram showing said area change when the marks and the lighted strip have a width as shown in FIG. 2.

The graphs of diagram FIG. 11 correspond to the showing of FIG. 2 , with its narrower marks and narrower lighted area. Here again the lighted white area has a constant rate of change.

Figure 12:
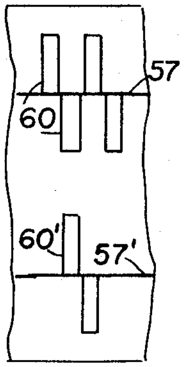
FIG. 12 is a diagram or graph of voltage created with the conditions shown in FIG. 11.

FIG. 12 illustrates the voltage induced in the second circuits 51, 51' under the assumption that the current in the primary circuits is proportional to the reflecting white area. When the electric current changes at a constant rate it induces a constant voltage, as shown by the graphs 60, 60' in FIG. 12 . 57, 57' again are the zero axes. This showing corresponds to FIG. 11 .

Figure 13:
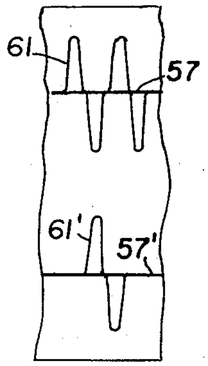
FIG. 13 is a diagram showing electric current that would be induced in secondary circuits by the voltages shown in FIG. 12, in the absence of half-wave rectifiers.
Figure 14:
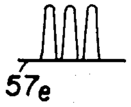
FIG. 14 is a diagram of the combined current after passing through half-wave rectifiers.

Graphs 61, 61' of FIG. 13 show the alternating current that would be induced in the second circuits 51, 51' under the above conditions in the absence of the half-wave rectifiers 53. The rectifiers cut off current in one direction. Only the top waves may then remain. Their combination is shown in FIG. 14 . $57_e$ is the zero axis. This is the electric current transmitted by wire 55 .

It should be noted that there is one distinct wave per mark . No mark, no wave.

While I have described one way of transforming the individual currents for combination to a single current, many further ways may be provided by applying the established knowledge of the art.

Numerous modifications may be made in my invention without departing from its spirit. For definition of its scope reliance is had on the appended claims.

I claim:

1. The method of scanning characters which comprises employing a record having characters arranged in a plurality of lines, said characters comprising areas of constant width having parallel marks thereon, each of said areas containing an upper and a lower level of equal spaces for selectively applying said marks thereon, emitting light from a narrow line-like area, sweeping said lines of characters from one end to the other with the narrow beam of light emitted from said line-like area, while moving said record at an angle to said line of characters, said angle differing from a right angle by less than 5°, said beam of light being narrower than a quarter of the width of a character area, forming an image of the narrow strip lighted by said beam which is in two halves corresponding to said upper and lower levels, respectively, and directing the light of said two levels to different photocells, respectively.

2. The method according to claim 1, wherein said spaces of the two levels of marks are displaced relatively to each other by about one-half of the width of a space in the direction of the lines of characters.

3. Apparatus for scanning characters, comprising a rotor containing at least one lens at a distance from its axis, the axis of said lens including an angle with the direction of the rotor axis, means for supporting a record bearing characters arranged in at least one line, means for projecting a narrow beam of light through said lens to said record to illuminate thereon a strip narrower than a quarter of the character width, so that the lighted strip moves along a line of characters as the rotor turns on its axis, means carried at least partly by said rotor, for forming an image of said moving strip adjacent a common point of fixed position, and means for transmitting light of each of a plurality of image parts making up said image to a different photocell.

4. Apparatus according to claim 3, wherein the axis of said lens intersects the rotor axis.

5. Apparatus according to claim 3, wherein said rotor contains a plurality of lenses spaced about its axis at a constant distance therefrom, said strip extends approximately in the direction of the rotor axis and includes an angle of less than 5° therewith.

6. Apparatus according to claim 5, wherein the means on the rotor for forming an image of the lighted strip comprises the same lens that projects the light to said strip, a beam splitter is set in the path of light between the circle of lenses and the rotor axis to direct part of the light returning from the record towards said common point.

7. Apparatus according to claim 5, wherein the means on the rotor for forming an image of the lighted strip comprises the same lens that projects the light to said strip, a plane mirror is set at an angle between the circle of lenses and the rotor axis to direct part of the light returning from the record towards said common point.

8. Apparatus according to claim 5, wherein the projection means includes an incandescent lamp having a filament emitting light from a straight narrow area, said filament being directed to approximately coincide with the direction of the rotor axis, including an angle of less than 5° with said direction.

9. Apparatus according to claim 3, wherein said means for projecting a narrow beam of light is placed to emit light appearing to come from the rotor axis, means are provided for supporting a record bent to follow a scanning line extending about the rotor axis, whereby said lens projects a strip of light to the record, and said lighted strip moves along the scanning line as the rotor turns.

10. Apparatus according to claim 3, wherein the means on the rotor for forming an image of the lighted strip comprises the same lens that projects the light to said strip.

11. Apparatus according to claim 3, wherein the means for transmitting light of different parts of said image to different photocells comprises tapered and curved light pipes.

12. Apparatus according to claim 3, wherein the light of each half-image is transmitted to a single photocell.

13. Apparatus according to claim 3, wherein means are provided for combining the electric currents of said different photocells after individual transformation.

* * * * *